Patented Mar. 27, 1928.                                1,664,348

UNITED STATES PATENT OFFICE.

MAX BUCHNER, OF HANOVER-KLEEFELD, GERMANY, ASSIGNOR TO ALBERT FRITZ MEYERHOFER, OF ZURICH, SWITZERLAND.

PROCESS FOR THE PRODUCTION OF HYDROFLUORIC ACID FROM FLUORIC AND SILICIC SUBSTANCES.

No Drawing.   Application filed June 18, 1925, Serial No. 38,099, and in Germany June 2, 1924.

manner. In the latter case hydrofluo-silicic acid and voluminous silicic acid can be obtained from the process permanently as by-products without any disturbance, in addition to the pure hydrofluoric acid.

The advantage of re-absorbing the silicon fluoride in the solution obtained by treating the raw material (Equation 2) with sulphuric acid is that it facilitates the decomposition of the raw product and prevents the formation of gas and greatly reduces the action of the fluoric acid on apparatus parts, and forms the fluorides in a simple manner.

The reaction between calcium fluoride and sulphuric acid is not complete without high temperatures to drive out the fluoric acid, and gaseous products would be produced. By my invention I am enabled to operate with solutions when the silicon fluoride is returned to the solution mixture, so that the reaction takes place in solution. When the increase of silicon fluoride becomes too great in the cycle, it is removed and used otherwise.

When sodium fluoride is used in the solution pure fluoric acid is produced with the formation of insoluble $Na_2SiF_6$.

The process may be carried out in a similar manner on the basis of potassium- or barium-silicofluoride. By this process it has become possible, to utilize for the production of hydrofluoric acid even strongly polluted fluorspars which have hitherto gone to the waste heap as without value. This process permits evidently, if this should be advisable, a combination with other methods of mechanical dressing of fluorspars.

According to this process not only the fluorspars can be utilized which are by nature polluted by silicic acid, but also other fluoric ores as apatite, sellaite, nocerin, the minerals of the cryolite group and so forth. The fluorine may be recuperated in the form of hydrofluoric acid, according to this process, even from artificial chemical compounds, especially from the waste slag of metallurgical operations and even if the percentage of silicic acid is very high.

The purification of hydrofluoric acid by transforming hydrofluo-silicic acid is the given form, as by the process hydrofluosilicic acid is produced from the silicic acid. For this purifying process other complex hydrofluoric acids may however be used. For instance boron fluoride is added to the mixture of hydrofluoric acid and hydrofluo-silicic acid which is produced at first, or the boron fluoride is added at the disintegrating process. A mixture of hydrofluo-silicic acid and boron hydrofluoric acid is thus obtained. This mixture gives with fluoride the desired pure hydrofluoric acid, and with alkali fluoride, for instance, sodium silicon fluoride and sodium boron fluoride.

By heating this mixture the desired sodium fluoride is reproduced and silicon fluoride and boron fluoride are obtained as secondary products, which go again into the process.

A shorter way for carrying out the improved purifying process consists in making the mixture of hydrofluoric acid and hydrofluo-silicic acid, obtained by the dressing, act directly upon fluorine salt. This conversion yields, on the one hand, pure hydrofluoric acid and, on the other hand, silicofluoric salt which, when fluoride is in excess, is mixed with the same. Hydrofluoric acid and hydrofluo-silicic acid give, when acting upon sodium fluoride, on the one hand, pure hydrofluoric acid and, on the other hand, sodium silicofluoride. From the latter the desired sodium fluoride is reconverted by separation, silicon fluoride being obtained as secondary product.

An excess of silicon fluoride may be obtained also from the other processes and this leads to combining the above process with such processes in which, owing to the use of silicon fluoride the metal-silico-fluorides, necessary for carrying through the new process, are obtained in another manner than above described. The silicon fluoride in excess might be used for instance for the production of sodium silicofluoride from sodium chloride and fluorspar in the presence of a little quantity of contact-acid in aqueous medium.

Claims:

1. The art of producing hydrofluoric acid from compounds containing fluorine and silicon, which comprises acting upon such a compound with an acid, reacting on the mixture with silicon fluoride to form hydrofluosilicic acid, reacting on the latter compound with a fluoride of an alkali forming metal to form hydrofluoric acid and a silico fluoride of the alkali forming metal, dissociating the silico-fluoride of the alkali forming metal thus obtained into fluoride of the alkali forming metal and into silicon fluoride for return to the cycle of operations.

2. The art of producing hydrofluoric acid from substances containing fluorine and silicon, which comprises reacting on said substances with a mineral acid and silicon fluoride to produce hydrofluosilicic acid, reacting on the hydrofluosilicic acid with an alkali metal fluoride to produce hydrofluoric acid and alkali metal silico fluoride, and decomposing the resulting alkali metal silico fluoride into alkali metal fluoride and silicon fluoride and returning the latter into the cycle of operations.

3. The art of producing hydrofluoric acid from substances containing fluorine and silicon, which comprises dissociating sodium silicofluoride into silicon fluoride and sodium fluoride; decomposing silicic fluorspar by sulphuric acid in the presence of the previously obtained silicon fluoride to produce hydrofluosilicic acid, and reacting with said hydrofluosilicic acid upon the sodium fluoride which has been produced to obtain pure hydrofluoric acid and reform sodium silicofluoride.

4. The art of producing hydrofluoric acid from a mixture of substances containing fluorine and silicon, which comprises treating said mixture with acids, reacting thereon with a complex fluoride to form complex fluoric acid, reacting on this complex fluoric acid with a fluoride of an alkali forming metal to form pure hydrofluoric acid and a complex fluoric salt of the alkali forming metal, dissociating the complex fluoride of the alkali forming metal thus obtained into alkalimetal fluoride and into the complex fluoride for return into the cycle of operations.

5. The art of producing hydrofluoric acid from mixtures of fluorides and silicious minerals, which comprises treating such a mixture with an acid to obtain a mixture of hydrofluoric acid and hydrofluosilicic acid, reacting on the latter mixture with an alkali metal fluoride to obtain pure hydrofluoric acid, a residue of alkali-metal complex fluoride and alkali-metal fluoride, and heating the residue.

In testimony that I claim the foregoing as my invention, I have signed my name.

Dr. MAX BUCHNER.